(12) United States Patent
Grobman

(10) Patent No.: US 8,984,613 B2
(45) Date of Patent: Mar. 17, 2015

(54) SERVER POOL KERBEROS AUTHENTICATION SCHEME

(75) Inventor: Steven L. Grobman, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 2296 days.

(21) Appl. No.: 11/650,225

(22) Filed: Jan. 5, 2007

(65) Prior Publication Data

US 2007/0127723 A1 Jun. 7, 2007

Related U.S. Application Data

(62) Division of application No. 10/696,443, filed on Oct. 28, 2003.

(51) Int. Cl.
| | |
|---|---|
| *H04L 1/00* | (2006.01) |
| *H04L 9/08* | (2006.01) |
| *G06Q 20/38* | (2012.01) |
| *H04L 9/32* | (2006.01) |
| *H04L 29/06* | (2006.01) |

(52) U.S. Cl.
CPC ............ *H04L 9/0822* (2013.01); *G06Q 20/382* (2013.01); *H04L 9/083* (2013.01); *H04L 9/3213* (2013.01); *H04L 63/045* (2013.01); *H04L 63/065* (2013.01); *H04L 63/0807* (2013.01)
USPC .............................................. 726/10; 705/50

(58) Field of Classification Search
USPC .......................................... 705/64–79; 726/2
See application file for complete search history.

(56) References Cited

U.S. PATENT DOCUMENTS

| | | | |
|---|---|---|---|
| 5,809,144 A | 9/1998 | Sirbu et al. | |
| 5,864,665 A | 1/1999 | Tran | |
| 6,006,332 A | 12/1999 | Rabne et al. | |
| 6,055,639 A | 4/2000 | Schanze | |
| 6,067,542 A | 5/2000 | Carino, Jr. | |
| 6,073,242 A | 6/2000 | Hardy et al. | |
| 6,148,402 A | 11/2000 | Campbell | |
| 6,175,920 B1 | 1/2001 | Schanze | |
| 6,286,104 B1 | 9/2001 | Buhle et al. | |
| 6,311,269 B2 | 10/2001 | Luckenbaugh et al. | |
| 6,401,211 B1 | 6/2002 | Brezak et al. | |
| 6,405,312 B1 | 6/2002 | Ly | |
| 6,411,309 B1 | 6/2002 | Ly | |
| 6,427,209 B1* | 7/2002 | Brezak et al. | .................... 726/10 |
| 6,678,731 B1* | 1/2004 | Howard et al. | ............... 709/225 |
| 7,055,032 B2 | 5/2006 | Sandhu et al. | |
| 7,093,020 B1 | 8/2006 | McCarty et al. | |
| 7,188,360 B2 | 3/2007 | Gerdes et al. | |
| 2002/0169890 A1* | 11/2002 | Beaumont et al. | ............ 709/245 |

(Continued)

OTHER PUBLICATIONS

"Kerberos Explained", <http://www.microsoft.com/technet/prodtechnol/windows2000> Microsoft Corporation, (2003), 1-3.

(Continued)

*Primary Examiner* — Steven Kim
*Assistant Examiner* — Tim Hale
(74) *Attorney, Agent, or Firm* — Schwabe, Williamson & Wyatt, P.C.

(57) ABSTRACT

The present disclosure relates to the authenticating a client against a pool of servers utilizing a secure authentication protocol, and, more specifically, to the authenticating a client against a pool of servers providing a common service, utilizing the Kerberos secure authentication protocol.

9 Claims, 5 Drawing Sheets

(56) References Cited

U.S. PATENT DOCUMENTS

| | | | |
|---|---|---|---|
| 2003/0005280 A1* | 1/2003 | Bobde et al. | 713/150 |
| 2003/0009538 A1* | 1/2003 | Shah et al. | 709/219 |
| 2003/0084292 A1* | 5/2003 | Pierce et al. | 713/168 |
| 2003/0093694 A1 | 5/2003 | Medvinsky et al. | |
| 2003/0140257 A1 | 7/2003 | Peterka et al. | |
| 2004/0083289 A1* | 4/2004 | Karger et al. | 709/226 |
| 2004/0128499 A1* | 7/2004 | Peterka et al. | 713/155 |
| 2009/0183003 A1* | 7/2009 | Haverinen | 713/168 |

OTHER PUBLICATIONS

"Kerberos: The Network Authentication Protocol", <http://web.mit.edu/kerberos/www/>,(2003), 1-3.

Kohl, J., et al., "The Kerberos Network Authentication Service (V5)", Network Working Group, Request for Comments:1510,(1993), 1-112.

Schnier, Bruce, "Kerberos", *Applied Cryptography: Protocols, Algorithms, and Source Code in C,* John Wiley & Sons, Inc., 2nd Ed., Chapter 24.5,(1996),566-571.

Final Office Action for U.S. Appl. No. 10/696,443 mailed Nov. 25, 2009, 11 pages.

Office Action for U.S. Appl. No. 10/696,443 mailed Apr. 14, 2009, 10 pages.

Final Office Action for U.S. Appl. No. 10/696,443 mailed Oct. 16, 2008, 9 pages.

Office Action for U.S. Appl. No. 10/696,443 mailed Apr. 16, 2008, 10 pages.

Office Action for U.S. Appl. No. 10/696,443 mailed Sep. 21, 2007, 8 pages.

Office Action for U.S. Appl. No. 10/696,443 mailed Apr. 5, 2007, 6 pages.

Office Action for U.S. Appl. No. 10/696,443, mailed Aug. 14, 2013, 13 pages.

* cited by examiner

Fig. 3

| 310 | 320 | 330 | | 380 | 390 |
|---|---|---|---|---|---|
| Number of Encrypted Session Keys | Session Key encrypted with 1st Server's Secret Key | Session Key encrypted with 2nd Server's Secret Key | ... | Session Key encrypted with nth Server's Secret Key | Cipher Text encrypted with Session Key. |

SERVER POOL KERBEROS AUTHENTICATION SCHEME

This U.S. patent application is a Divisional of U.S. patent application Ser. No. filed 10/696,443 filed Oct. 28, 2003.

BACKGROUND

1. Field

The present disclosure relates to the authenticating a client against a pool of servers utilizing a secure authentication protocol, and, more specifically, to the authenticating a client against a pool of servers providing a common service, utilizing the Kerberos secure authentication protocol.

2. Background Information

Kerberos is a trusted third-party authentication protocol designed for client/server interactions. J. Kohl and B. Neuman, "*The Kerberos network authentication service (version 5)*," RFC-1510, 1993. Hereafter, a service that is substantially in compliance with the above Kerberos specification, its derivatives, or antecedents is simply referred to as "Kerberos." This includes imperfect or corrupted implementations.

A Kerberos service allows a person or client to access different machines on a network. Kerberos shares a different secret key with every entity on the network and knowledge of that secret key is considered proof of identity.

An example of a Kerberos session is illustrated in FIG. 1. A client 100 may wish to access a network service running on network server 120. In order to do so, it must verify that it has the proper credentials to access the service utilizing the Kerberos Key Distribution Center (KDC) 110.

Arrow 130 illustrates that in this example, when logging onto the network, the client may request a Ticket-Granting-Ticket (TGT) from the Authentication Service (AS) 113. The client may do this by answering a challenge issued by the AS using a password. Of course, other techniques are often used and this is merely an illustrative example. Once the AS verifies that the client is a valid entity on the domain, arrow 135 illustrates that a Ticket-Granting-Ticket may be issued. This TGT is typically cached on the local machine and used to request network service sessions throughout the network.

The Ticket-Granting-Ticket usually includes two parts: a main portion of the TGT which is encrypted with a key that only the TGS 117 can decrypt, and a session key encrypted with the client's secret key. This session key is used to handle future communications with the KDC. Because the client cannot read the main portion of the TGT contents, it must blindly present the ticket to the Ticket Granting Service 117 for service tickets. In some embodiments, the TGT also includes time-to-live parameters, authorization data, or other data.

When the client 100 wishes to access a Network Service 120, the client presents the Ticket-Granting-Ticket to the Ticket Granting Service (TGS) 117 and requests a Service Ticket, as illustrated by arrow 140. The TGS receives the TGT and decrypts it using the TGS's secret key. The TGS determines which server provides the service the client is requesting a ticket for. The TGS then encrypts a session key with that server's secret key. This encrypted session key is incorporated into the Session Ticket. Arrow 145 illustrates that the TGS may respond to a valid request by returning a valid Service Ticket to the client.

Arrow 150 illustrates that this Service ticket may be presented to network server 120 by client 100. The Network server may then decrypt the session key using the server's secret key. Arrow 155 illustrates that the client-server session may then be established. During each of the client-KDC and client-server transactions the various tickets may have been also encrypted with the client's secret key, allowing the KDC and client to verify that the transaction was not intercepted nor involved a spoofed client or KDC.

This is merely an illustrative example of a Kerberos transaction. However, it does illustrate that the Kerberos protocol assumes that one, and only one, server provides each service. Therefore, if a service is to utilize a Kerberos protocol, it must be tied to a single server. This prevents the use of a server pool and the ability for a network to perform load balancing, among other tasks. Some techniques avoid this problem by sharing a single password among multiple servers. This technique, however, increases the manageability of the servers, for example, all server passwords must by synchronized, and decreases the security of the server pool, for example, compromising one server eases the compromising of the rest of the server pool.

BRIEF DESCRIPTION OF THE DRAWINGS

Subject matter is particularly pointed out and distinctly claimed in the concluding portions of the specification. The disclosed subject matter, however, both as to organization and the method of operation, together with objects, features and advantages thereof, may be best understood by a reference to the following detailed description when read with the accompanying drawings in which:

FIG. 3 is a block diagram illustrating an embodiment of a Service Ticket to facilitate a client to authenticate against a pool of servers utilizing a secure authentication protocol in accordance with the disclosed subject matter;

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

Kerberos is a trusted third-party authentication protocol designed for client/server interactions. J. Kohl and B. Neuman, "*The Kerberos network authentication service (version 5)*," RFC-1510, 1993. Hereafter, a service that is substantially in compliance with the above Kerberos specification, its derivatives, or antecedents is simply referred to as "Kerberos." This includes imperfect or corrupted implementations.

Figure 1:
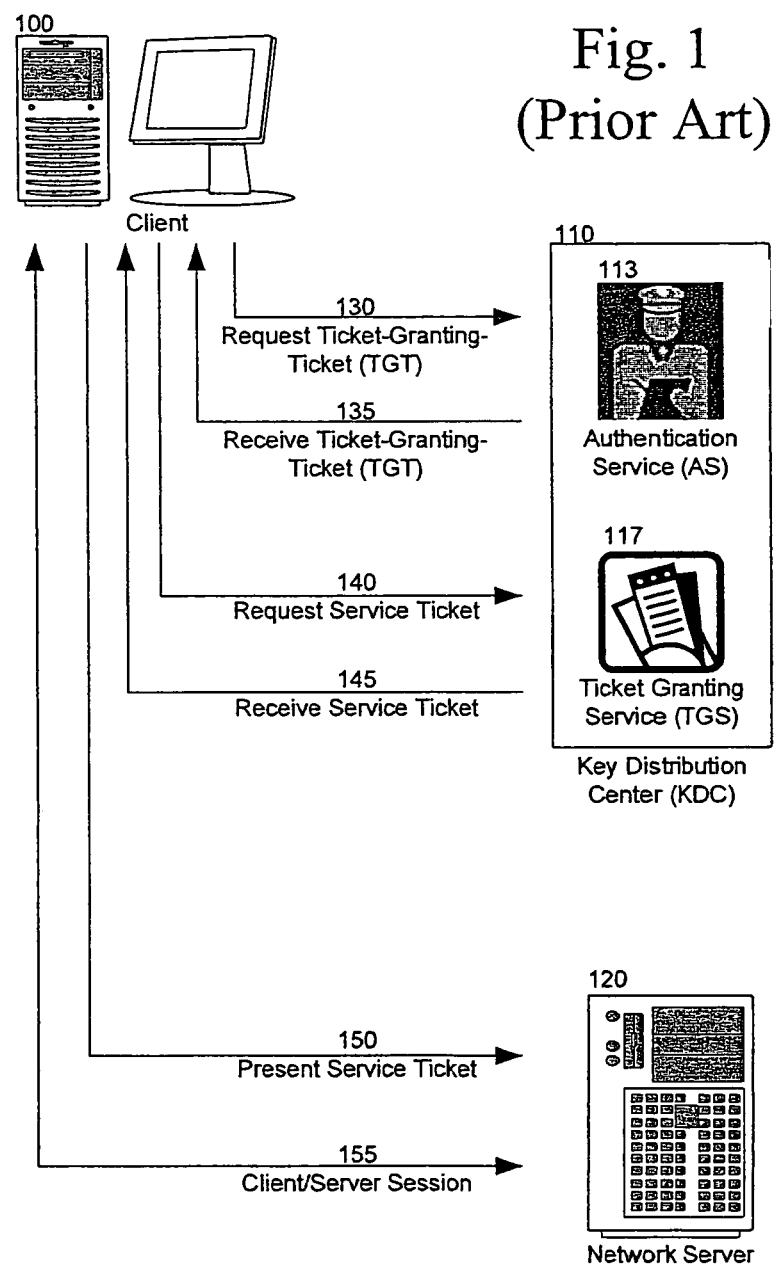
FIG. 1 is a block diagram illustrating an embodiment of a technique for the authenticating a client utilizing the Kerberos protocol.
Figure 2:
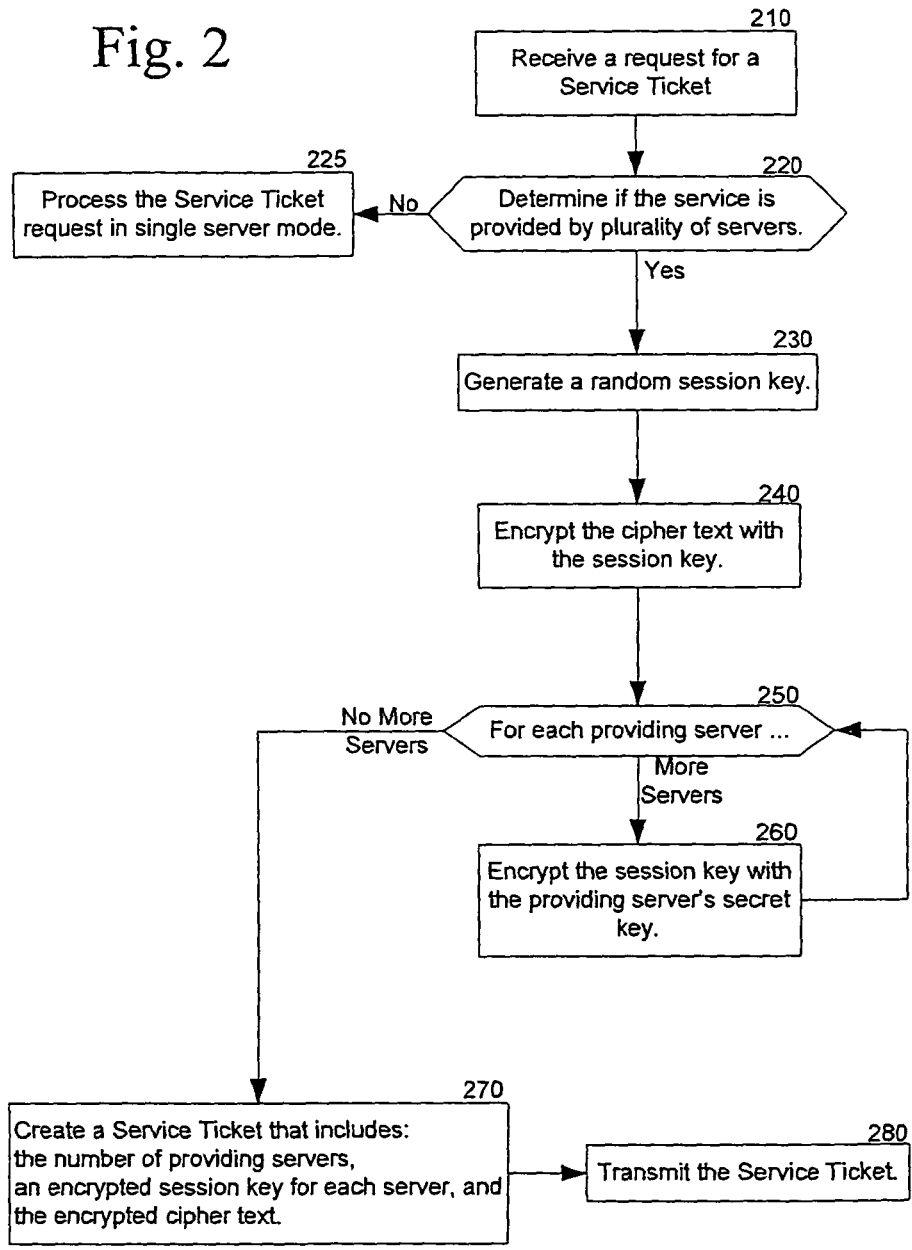
FIG. 2 is a flowchart illustrating an embodiment of a technique for generating a Service Ticket to facilitate a client to authenticate against a pool of servers utilizing a secure authentication protocol in accordance with the disclosed subject matter.

FIG. 2 is a flowchart illustrating an embodiment of a technique for generating a Service Ticket to facilitate a client to authenticate against a pool of servers utilizing a secure authentication protocol in accordance with the disclosed subject matter. Block 210 illustrates that a Ticket Granting Service may receive a request for a Service Ticket. The Service Ticket may provide access to a client to a particular network service. In one embodiment, the Ticket Granting Service may, aside from the disclosed subject matter, substantially comply with the Kerberos protocol. It is also contemplated that the service be provided by the same machine as the requesting client. It is further contemplated that the client and server may be any physical or virtual machine including any architecture.

Block 220 illustrates that the Ticket Granting Service may determine if the requested service is provided a plurality of servers. In one embodiment, the Ticket Granting Service may utilize a Domain Name Server to determine if a generic domain name is aliased to a plurality of specific domain names. If so, the Granting Service may infer that multiple servers exist. In another embodiment, the Granting Service may refer to another database, such as, for example, a Kerberos Database, to determine if multiple servers exist. These are of course, merely a few non-limiting illustrative examples. It is contemplated that in one embodiment, the standard Kerberos database may be modified to include alias information that would facilitate the mapping of a generic server name to a plurality of specific server names.

Block 225 illustrates that, in one embodiment, if the service is provided by a single server, the Service Ticket request may be provided in single server mode. In one embodiment, the single server mode may include strict adherence to the standard Kerberos protocol. In another embodiment, the adherence to the Kerberos protocol may be less strict. It is contemplated that in yet another embodiment another technique may be used. It is also contemplated that in one embodiment, all Service Ticket requests may be processed in the same manner regardless of the number of servers utilized, and block 225 and, possibly, block 220 may not be used.

Block 230 illustrates that the Granting service may generate a random session key. Block 240 illustrates that a cipher text may be created or used. This cipher text may be encrypted with the session key. In one embodiment the cipher text may be an authenticator that includes, in one particular embodiment, the name of the client, the network address of the client, and a timestamp.

Block 260 illustrates that the session key may be encrypted with the secret key of the server providing the service. Block 250 illustrates that block 260 may be repeated for each providing server. In an illustrative embodiment, if there are, for example, 3 servers capable of providing the requested service, the Granting Service may encrypt the session key with the first server's secret key, resulting in a first encrypted session key. The session key may be encrypted with the second server's secret key, resulting in a second encrypted session key. Finally, the session key may be encrypted with the third server's secret key, resulting in a third encrypted session key. However, it is contemplated that any number of providing servers may be used and the illustrative embodiment is not meant to limit the disclosed subject matter to any particular number of providing severs.

In one embodiment, the secret keys of the providing servers may or may not be synchronized across all servers in the server pool. In another embodiment, only a portion of the providing server pool's secret keys may be synchronized. In another embodiment, sets of servers may be securely defined with one secret key associated with each server. In one illustrative example, specific server ABC may be associated with both generic servers 123 and 789. Conversely specific server XYZ may only be associated with generic server 123. Therefore, if a client requests access to generic server 789, it would only be able to use gain access to specific server ABC, even tough specific servers ABC & XYZ are pooled for generic server 123. In yet another embodiment, at least a portion of the server pool may function as a cluster server. It is also contemplated that, in some embodiments, the session key may be a one-time key.

Block 270 illustrates that a Service Ticket may be created that includes the number of providing servers, an encrypted session key for each server, and the encrypted cipher text. It is contemplated that, in one embodiment, the number of providing severs may be inherently included in the number of encrypted session keys. Therefore, in one embodiment, the Service Ticket may not include a field expressly stating the number of providing servers, but instead, may rely upon the number of encrypted session keys to provide that information. Block 280 illustrates that the Service Ticket may be transmitted, in one embodiment, to the requesting client.

FIG. 3 is a block diagram illustrating an embodiment of a Service Ticket 300 to facilitate a client to authenticate against a pool of servers utilizing a secure authentication protocol in accordance with the disclosed subject matter. The Service Ticket may include a field 310 expressly denoting the number of encrypted session keys or providing servers. A number of encrypted sessions keys may also be included, illustrated as fields 320, 330, & 380. While at least 3 encrypted session keys are illustrated in FIG. 3, it is understood that the disclosed subject matter is not limited to any number of encrypted session keys. Filed 390 may also include the encrypted cipher text. It is contemplated that the fields may be arranged in any easily determinable order and the disclosed subject matter is not limited to the arrangement illustrated. In one embodiment, the Service Ticket illustrated by FIG. 3 may have been generated in accordance with the technique illustrated in FIG. 2.

Figure 4:
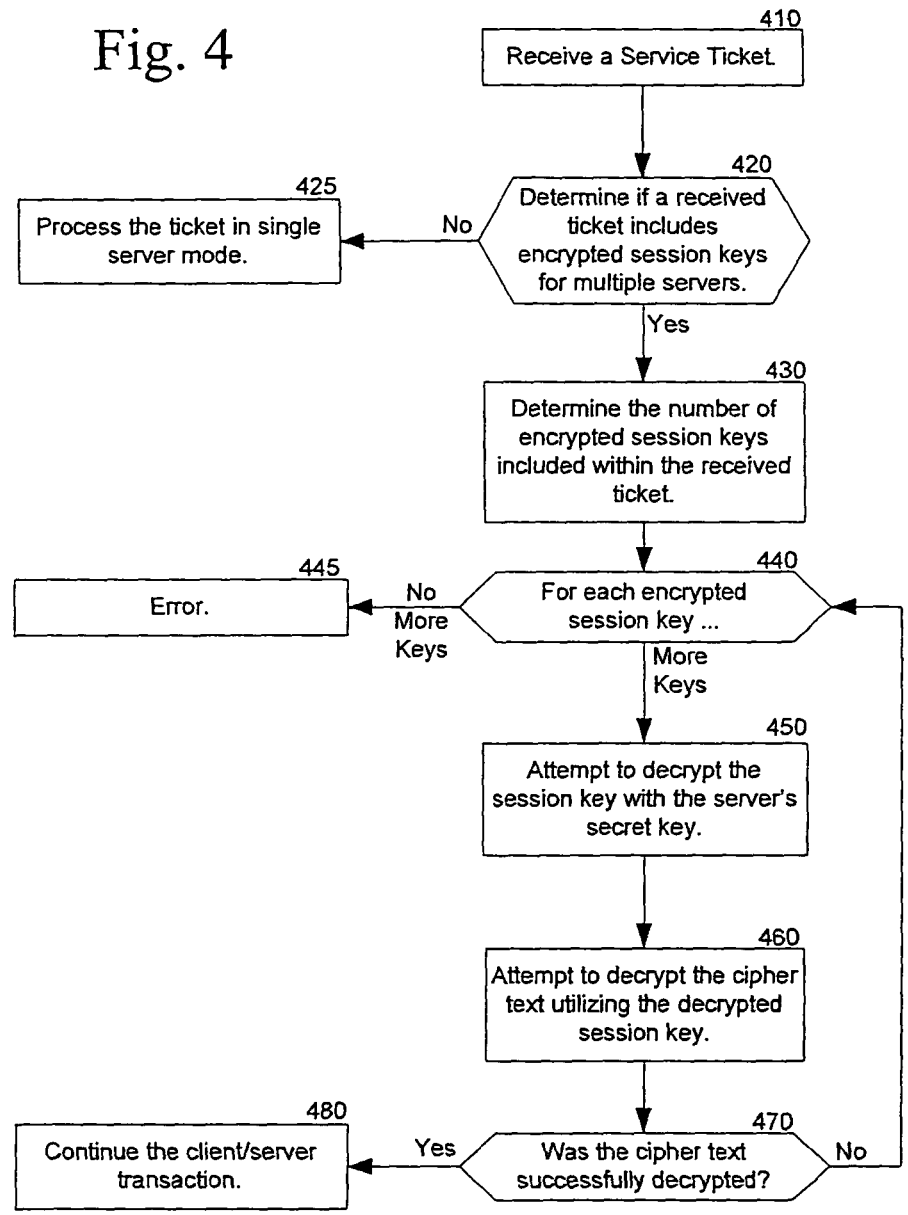
FIG. 4 is a flowchart illustrating an embodiment of a technique for authenticating a client against a pool of servers utilizing a secure authentication protocol in accordance with the disclosed subject matter.

FIG. 4 is a flowchart illustrating an embodiment of a technique for authenticating a client against a pool of servers utilizing a secure authentication protocol in accordance with the disclosed subject matter. Block 410 illustrates that a providing server may receive a Service Ticket. In one embodiment, the Service Ticket may contain the fields illustrated in FIG. 3. However, other arrangements and fields are contemplated and within the scope of the disclosed subject matter.

Block 420 illustrates that the received ticket may be examined to determine if it includes encrypted session keys for multiple providing servers. If not, block 425 illustrates that the ticket may be processed in single server mode. In one embodiment, the single server mode may include strict adherence to the standard Kerberos protocol. In another embodiment, the adherence to the Kerberos protocol may be less strict. It is contemplated that in yet another embodiment another technique may be used. It is also contemplated that in one embodiment, all received Service Tickets may be processed in the same manner regardless of the number of servers utilized, and block 425 and, possibly, block 420 may not be used.

Block 430 illustrates that the number of encrypted session keys may be determined. In one embodiment the number of encrypted session keys, or servers, may be expressly noted within the Service Ticket. In another embodiment, the number of encrypted session keys may be dynamically determined by examining the Service Ticket.

Block 440 illustrates that the server may loop through each encrypted session key until the correct encrypted key is found. Block 445 illustrates that if the correct key is not found and error may be generated. In one embodiment, the server may silently ignore the client's request for the service. Conversely, in another embodiment, the server may report the unsuccessful access attempt to, for example, the client, or an agent that monitors the network security. However, other responses are contemplated and these are just a few non-limiting examples.

In one embodiment, the server may not need to enumerate through the encrypted session keys. For example, each encrypted key may be paired with a particular server identifier field. The server identifier field may express denote which encrypted session key utilizes the secret key of the receiving server. In one embodiment, the server identifying field may denote the Internet Protocol number of each server. The receiving server may then go directly to the encrypted session key associated with the receiving server's Internet Protocol number. As a result, block 440 would not be needed. In other embodiments, other techniques for determining which encrypted session key is associated with the receiving server may be used.

Block 450 illustrates that the server may attempt to decrypt the current encrypted session key with the server's secret key. Block 460 illustrates that an attempt to decrypt the cipher text may then be made utilizing the decrypted session key. If the session key was successfully decrypted, the cipher text should be successfully decrypted as well. If the session key was not encrypted with the receiving server's secret key, it will not successfully decrypt and the cipher text will also not successfully decrypt.

Block 470 illustrates that the server may determine if the cipher text was successfully decrypted. If not, the server will loop back to block 440 and attempt to decrypt the next encrypted session key, if any exist. If so, block 480 illustrates that client has gained access to the requested service and that the requested client-server transaction may continue.

Figure 5:
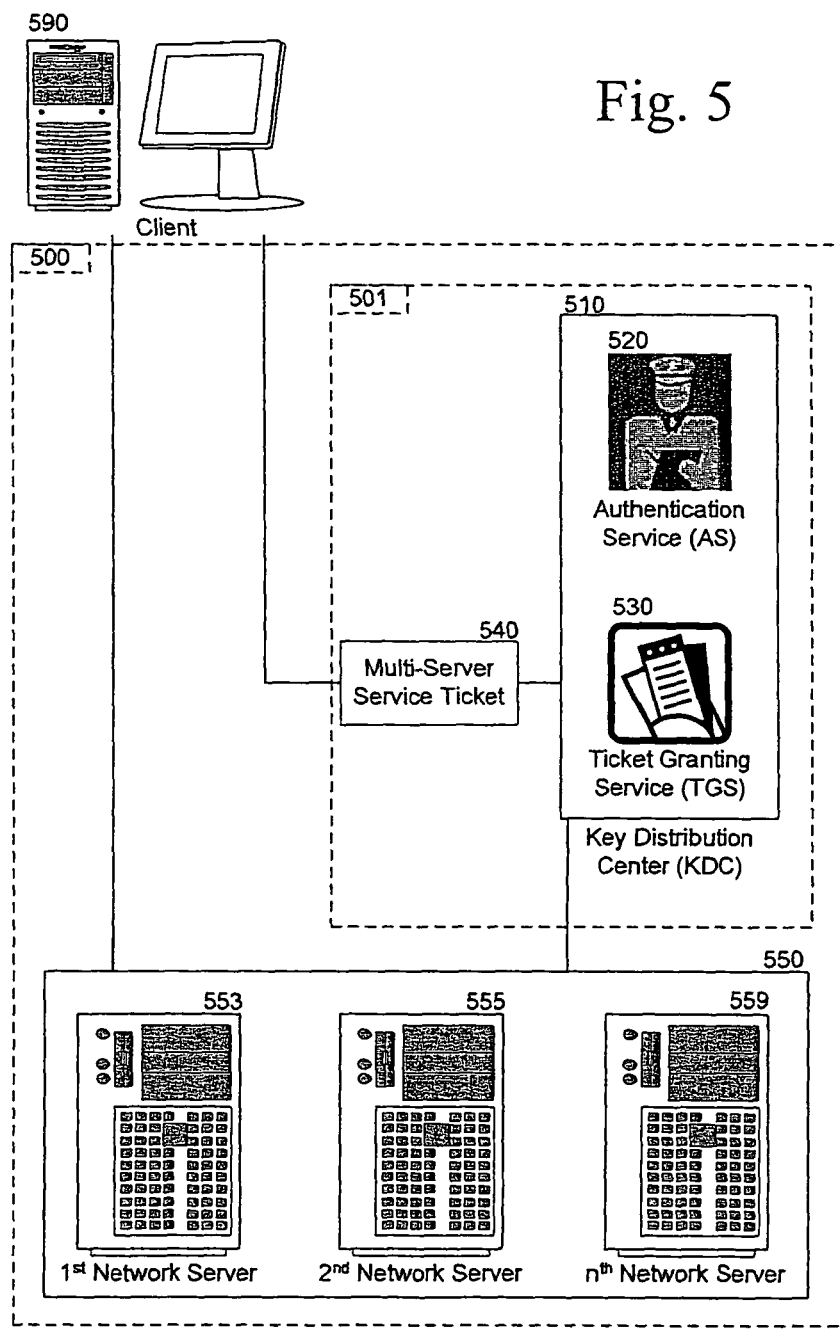
FIG. 5 is a block diagram illustrating an embodiment of an apparatus and a system that allows for the authenticating a client against a pool of servers utilizing a secure authentication protocol in accordance with the disclosed subject matter.

FIG. 5 is a block diagram illustrating an embodiment of an apparatus 501 and a system 500 that allows for the authenticating a client against a pool of servers 550 utilizing a secure authentication protocol in accordance with the disclosed subject matter. In one embodiment, apparatus 501 may include a Key Distribution Center (KDC) 510 capable of generating a multi-server service ticket 540. In one embodiment, the KDC may be, aside from the capability to generate the multi-server service ticket, substantially in compliance with the Kerberos protocol.

Key Distribution Center (KDC) 510 may include an Authentication Service (AS) 520 and a Ticket Granting Service (TGS) 530. The AS may be capable of authenticating that a client 590 is legitimately accessing the KDC and/or the network domain and be capable of issuing a Ticket-Granting-Ticket to the client. In one embodiment, the AS these capabilities may be provided substantially in compliance with the Kerberos protocol. The TGS may be capable of receiving a request for a Service Ticket and issue a multi-server service ticket 540. In one embodiment, the TGS may be capable of performing the technique illustrated by FIG. 2. In one embodiment, the Multi-Server Service Ticket may include the fields illustrated by FIG. 3. In one embodiment, the request for a Service Ticket may include or utilize the Ticket-Granting-Ticket issued by the AS.

System 500 may include the apparatus 501 and a pool of servers 550. The pool of servers may be capable of receiving and utilizing a multi-server service ticket 540. In one embodiment, the servers in the pool may be capable of performing the technique illustrated in FIG. 4. It is contemplated that while FIG. 5 shows three network servers 553, 555, & 559 in the server pool, the disclosed subject matter is not limited to any particular number of servers. It is contemplated that in a unique embodiment, only one server may exist in the pool at a particular time.

In an illustrative example, client 590 may authenticate itself on the network utilizing the Key Distribution Center (KDC) 510, and in particular, the Authentication Server (AS) 510. The client may receive a Ticket-Granting-Ticket (TGT). The client may use this TGT to request a Service Ticket from the Ticket Granting Service (TGS) 530. The TGS may determine that the service is provided by a server pool 550, and issue a Multi-Server Service Ticket 540. The client may present this Service Ticket to the server pool. The Second Network Server 555 may be selected by the manager of the server pool to process the client's request. The Second Network Server may authenticate the client's ability to receive the service and provide the service to the client. It is understood that the above example is merely one possible embodiment of the use of the apparatus 501 and system 500 and other uses are possible and contemplated.

It is also contemplated that the disclosed subject matter is not limited to any particular computing platform. While FIG. 5 utilizes representations of traditional personal computers the disclosed subject matter is not limited to any particular architecture and may include devices, such as, for example, a laptop computer, a handheld computer, a personal digital assistant, a wireless local area network (WLAN) device, and a computer peripheral, such as, for example, a printer or mouse. However, these are merely a few non-limiting examples of such a device.

The techniques described herein are not limited to any particular hardware or software configuration; they may find applicability in any computing or processing environment. The techniques may be implemented in hardware, software, firmware or a combination thereof. The techniques may be implemented in programs executing on programmable machines such as mobile or stationary computers, personal digital assistants, and similar devices that each include a processor, a storage medium readable or accessible by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact read only memory (CD-ROM), digital versatile disk (DVD), hard disk, firmware, non-volatile memory, magnetic disk or similar medium or device, that is readable by a general or special purpose programmable machine for configuring and operating the machine when the storage medium or device is read by the computer to perform the procedures described herein. The system may also be considered to be implemented as a machine-readable or accessible storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. An apparatus comprising:
one or more processing devices;
one or more non-transitory computer readable media having executable instructions thereon that, in response to execution of the instructions by the one or more processing devices, cause the apparatus to:
authenticate, with an authentication service of the apparatus, whether a client device is eligible to access a key distributor;
issue to the client device, with the authentication service, a grant ticket if the client device is authenticated;
accept, with a ticket granting service of the apparatus, the grant ticket from the client device;
determine, with the ticket granting service, whether a plurality of servers are available to provide the requested network service;
generate, with the ticket granting service, an unencrypted session key;
encrypt, with the ticket granting service, a text with the unencrypted session key;
determine, with the ticket granting service, a number of servers available to provide the network service requested by the client device;
for each determined server, encrypt, with the ticket granting service, the unencrypted session key with a secret key of the corresponding server;
create, with the ticket granting service, a service ticket that includes the encrypted text and the plurality of encrypted session keys associated with respective ones of the plurality of servers; and
transmit, with the ticket granting service, the service ticket to the client device.

2. The apparatus of claim 1, wherein authenticate the client device includes utilize a protocol in compliance with the Kerberos protocol.

3. The apparatus of claim 1, wherein determine the number of servers available to provide the requested network service includes:
use a database to map a generic server name to one or more specific server names; and
set the number of providing servers equal to the number of specific servers mapped to the generic server that provides the same network service requested by the client device.

4. A system comprising:
one or more processing devices; and
one or more non-transitory computer readable media having executable instructions thereon that, in response to execution of the instructions by the one or more processing devices, cause the system to:
authenticate, with a key distribution center of the system, whether a client device is eligible to access the key distribution center;
issue to the client device, with the key distribution center, a grant ticket, if the client device is authenticated, for use to access the requested network service;
accept, with the key distribution center, the grant ticket from the client device; and
determine, with the key distribution center, whether a plurality of servers are available to provide the requested network service;
generate, with the key distribution center, an unencrypted session key;
encrypt, with the key distribution center, a text with the unencrypted session key;
determine, with the key distribution center, a number of servers available to provide the requested network service;
for each determined server, encrypt, with the key distribution center, the unencrypted session key with a secret key of the corresponding server;
create, with the key distribution center, a service ticket that includes the encrypted text and the plurality of encrypted session keys associated with respective ones of the providing servers; and
transmit, with the key distribution center, the service ticket to the client device.

5. The system of claim 4, wherein the executable instructions, in response to execution by the one or more processing devices, cause the system to:
utilize, with the key distribution center, a protocol in compliance with the Kerberos protocol.

6. The system of claim 4, wherein determine the number of servers available to provide the requested service includes:
utilize a database that maps a generic server name to one or more specific server names; and
set the numbers of servers available to provide the service equal to the number of specific servers mapped to the generic server that provides the requested service.

7. The system of claim 4, wherein the plurality of servers are configured to work together as a single system.

8. The system of claim 4, further comprising:
the plurality of servers;
wherein at least one of the plurality of servers includes a second one or more processing devices and one or more non-transitory computer readable media having instructions thereon that, in response to execution of the instructions by the second one or more processing devices, cause the at least one of the plurality of servers to:
receive the service ticket having the plurality of encrypted session keys and the encrypted text;
decrypt one or more of the encrypted session keys in the service ticket with the secret key of the corresponding associated server to recover the one or more decrypted session keys;
decrypt the encrypted text with one of the one or more decrypted session keys; and
provide the network service to the client device, if the encrypted text is successfully decrypted.

9. An apparatus comprising:
one or more processing devices;
one or more non-transitory computer readable media having instructions thereon that, in response to execution of the instructions by the one or more processing devices, cause the apparatus to:
authenticate, with an authentication service of the apparatus, whether a client device is eligible to access a key distributor;
issue to the client device, with the authentication service, a grant ticket if the client device is authenticated;
accept, with a ticket granting service of the apparatus, the grant ticket from the client device;
generate, with the ticket granting service, the unencrypted session key;
encrypt, with the ticket granting service, a text with the unencrypted session key;
use, with the ticket granting service, a database to map a generic server name to one or more specific server names;

determine, with the ticket granting service, a plurality of servers available to provide the network service requested by the client device by setting a number of providing servers equal to the number of specific servers mapped to the generic server that provides the same network service requested by the client device.

for each determined server, encrypt, with the ticket granting service, the unencrypted session key with the secret key of the corresponding server;

create, with the ticket granting service, a service ticket that includes the encrypted text and the plurality of encrypted session keys associated with respective ones of the plurality of servers; and transmit, with the ticket granting service, the service ticket to the client device.

* * * * *